US007581012B2

(12) United States Patent
Shiouchi et al.

(10) Patent No.: US 7,581,012 B2

(45) **Date of Patent: *Aug. 25, 2009**

(54) VIRTUAL COMMUNICATION CHANNEL AND VIRTUAL PRIVATE COMMUNITY, AND AGENT COLLABORATION SYSTEM AND AGENT COLLABORATION METHOD FOR CONTROLLING THE SAME

(75) Inventors: Masatoshi Shiouchi, Kawasaki (JP); Tadashige Iwao, Kawasaki (JP); Makoto Okada, Kawasaki (JP); Shigeichiro Yamasaki, Kawasaki (JP); Takao Mohri, Kawasaki (JP); Yuji Wada, Kawasaki (JP); Takashi Nishigaya, Kawasaki (JP); Shigeki Fukuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 305 days.

This patent is subject to a terminal disclaimer.

(21) Appl. No.: 10/230,164

(22) Filed: Aug. 29, 2002

(65) Prior Publication Data

US 2003/0018792 A1 Jan. 23, 2003

Related U.S. Application Data

(63) Continuation-in-part of application No. 09/788,474, filed on Feb. 21, 2001, now Pat. No. 7,171,441.

(30) Foreign Application Priority Data

Sep. 7, 2000 (JP) ............................ 2000-272195
Aug. 30, 2001 (JP) ............................ 2001-262097

(51) Int. Cl.
*G06F 15/16* (2006.01)
*G06F 15/173* (2006.01)
*H04L 29/06* (2006.01)
*H04L 9/32* (2006.01)
*G06F 17/00* (2006.01)

(52) U.S. Cl. ...................... 709/229; 709/202; 709/225; 713/156; 713/176; 726/1; 726/4

(58) Field of Classification Search ...................... None
See application file for complete search history.

(56) References Cited

U.S. PATENT DOCUMENTS 6,144,989 A * 11/2000 Hodjat et al. ............... 709/202
6,317,438 B1 * 11/2001 Trebes, Jr. .................. 370/466
6,513,059 B1 * 1/2003 Gupta et al. ................ 709/202

OTHER PUBLICATIONS

"What is gnutella?", http://www.gnutellanews.com/information/what is gnutella.shtml, Aug. 15, 2000.
"The Gnutella Protocol Specification v0.4[1]"(Document Revision 1.0), htttp://www.clip2.com/GnutellaProtocol04.pdf, Jun. 3, 2001.

* cited by examiner

*Primary Examiner*—John B. Walsh
(74) *Attorney, Agent, or Firm*—Staas & Halsey LLP

(57) ABSTRACT

A policy that relates attributes of an agent to a role is distributed to each agent on a network. A field connector generates an internal field in accordance with an instruction of a security manager. A ROLE manager uses attribute information from an attribute manager, and assigns each agent a ROLE in accordance with the attributes of each agent, and installs a ROLE method table and a ROLE execution part. When receiving a message from an external network, each agent searches for a corresponding ROLE by referring to the ROLE method table, and executes the ROLE. Thus, collaboration among agents is realized through a virtual communication channel based on the exchange of a message.

5 Claims, 9 Drawing Sheets

Examplary description of a policy

```
<?xml version="1.0" encoding="ISO-8859.1"?>
<!DOCTYPE Policy>
<Policy name="Image distribution"
    <JarFile name="image.jar"/>
    <JarFile name="image.xml"/>
    <JarFile name="Image 1"/>
    <JarFile name="Imege 2"/>
    <Rule>
        <Attribute name="pay" value="yes"/>
        <Role name="register user" class="imageviewer.RegisteredViewer"><Text>Registered user</Text></Role>
    </Rule>
    <Rule>
        <Attribute name="provider" value="yes"/>
        <Role name="Provider" class="imageviewer.Provider"><Text>Provider</Text></Role>
    </Rule>
    <Rule>
        <NOT><Attribute name="pay" value="yes"/></NOT>
        <Role name="Unregister user" class="imageviewer.UnregisteredViewer"><Text>Unregistered user</Text></Role>
    </Rule>
</Policy>
```

1 Distribution file name

2 Rule

3 Attribute condition

4 Roll name

*Fig.1*

VIRTUAL COMMUNICATION CHANNEL AND VIRTUAL PRIVATE COMMUNITY, AND AGENT COLLABORATION SYSTEM AND AGENT COLLABORATION METHOD FOR CONTROLLING THE SAME

This application is a Continuation-in-Part of application Ser. No. 09/788,474, filed Feb. 21, 2001, now U.S. Pat. No. 7,171,441.

BACKGROUND OF THE INVENTION

1. Field of the Invention

The present invention relates to an agent collaboration apparatus and an agent collaboration method for providing agent collaboration service among resources such as agents on a network, and a computer-readable recording medium storing an agent collaboration program. Further, the present invention relates to a virtual communication channel on a network that is dynamically generated among agents on demand, and a virtual private community generated by the virtual communication channel.

2. Description of the Related Art

In recent years, a computer network has advanced, and information communication service is provided among computer resources such as multiagents distributed over a network. In the prior art, as a method for connecting communication entities on the network through a communication channel, there are a peer to peer communication method and a multicast method. According to the peer to peer communication method, a communication entity that is to transmit information specifies a communication entity that is to receive the information, and individually transmits information. According to the multicast method, a communication entity that is to transmit information distributes the information to all the communication entities on the network without specifying a communication entity that is to receive the information.

The peer to peer communication method can also provide service such as broadcast communication from one communication entity to plural communication entities, using a mailing list or the like. However, in terms of relationship between the communication entity that is to transmit information and the communication entity that is to receive information, this merely corresponds to that information is individually distributed by specifying a communication partner. This is because one-to-one communication, in which the address of each communication partner is specified, is conducted in a parallel manner.

As the multicast method for connecting communication entities, CORBA Event service (CORBA: The Common Object Request Broker Architecture and Specification), IP-Multicast, Internet Relay Chat (IRC) and the like are known. These communication services control communication among servers. In order to organize agent collaboration service involving servers like this, it is required to connect and manage servers with a predetermined protocol, and implemented systems on each server should also be tuned according to the contents of agent collaboration service.

The Event service requires that a communication server should actively participate in a communication network, in which desired information is exchanged, through a predetermined procedure. The contents of agent collaboration service are focused on the notification of a system error, so that the service regarding error notification is implemented. The Event service has a constraint that a server receives a message, creates a data receiving object, and registers it to a particular topic.

The IP-Multicast also requires that a communication server should actively participate in a communication network, in which desired information is exchanged, through a predetermined procedure. It is a constraint that the address of a communication partner to which information is multi-cast should be previously registered.

The IRC is featured in that a communication server should also actively participate in a communication network, in which desired information is exchanged, through a predetermined procedure. And the contents of agent collaboration service are focused on text communication between users. The IRC has a constraint that communication should follow the IRC protocol.

In the above-mentioned conventional peer to peer communication method, it is required to previously register the addresses of all the distribution targets when information is communicated among resources such as multiagents on the network by using a mailing list. This means that an agent (or a user) distributing information must specify all the distribution targets explicitly in distribution of information. However, in some cases, an information distributor cannot always specify the targets that receive information explicitly. And it will be bothersome to manage a number of distribution targets. Thus, it is very difficult to distribute information to a number of widely distributed partners, and this means lack of scalability. Further, an agent collaboration system does not mediate the communication, so that an agent transmitting information is required to be responsible for feasibility of distribution. As a result, the burden of each agent will increase.

The above-mentioned conventional Multicast method, which connects communication entities to each other, have problems as follows.

First, the distribution efficiency of a network is decreased. According to the conventional Multicast method, information is distributed to the entire network without specifying a receiver, and all the agents on the network will receive the information. In this case, every information is also transmitted to an agent that does not require the information. This increases the amount of data flowing on the network, and increases the processing load for received data by the agent.

Second, security is decreased. According to the conventional Multicast method, information is distributed to the entire network without specifying a receiver as described above, and all the agents will receive the information on the network. Therefore, the information is transmitted to those who should not receive it; thus, leakage of information cannot be prevented. The arrival of information is not guaranteed because of impossibility of routing control.

Third, it is difficult to dynamically reconfigure the fixed system configuration. With the conventional Multicast system, agent collaboration is mainly conducted by the server, which is configured according to its role and selected depending upon the contents of information to be brokered and the brokering process; so it is hard to reconfigure the once generated system. Further, in order to conduct particular service or to solve a particular problem by exchanging information among servers and agents, it is required that information should be shared among servers or agents. In order for information to be shared among servers or agents, a communication channel for exchanging information is required, and it is required for the individual server or agent to implement a program for exchanging information among servers or agents.

SUMMARY OF THE INVENTION

Therefore, with the foregoing in mind, it is an object of the present invention to provide an agent collaboration system that flexibly and dynamically defines and controls a virtual communication channel for transmitting/receiving information in accordance with the request or service contents, and realizes collaboration among agents by using the virtual communication channel. It should be noted that this virtual communication channel is dynamically defined at the beginning of agent collaboration service, provided, dynamically updated according to the change in the contents of the agent collaboration service, and dynamically cancelled and self-destroyed at the completion of the agent collaboration service.

In order to achieve the above-mentioned object, in the agent collaboration system of the present invention for connecting agents to each other through a virtual communication channel, each agent on the virtual communication channel includes: a policy storing part for storing a policy that is a collection of rules containing a rule representing a relationship between attributes of the agent and a role assigned in accordance with the attributes; a role assignment part having the policy storing part, for assigning a role in accordance with the attributes of the agent based on the policy; a role-execution condition holding part for holding and storing the role assigned by the role assignment part and conditions for executing contents of the role; and a processing execution part for executing corresponding contents of a role in a case where the execution conditions for the contents of the role are satisfied, wherein the agents collaborate with each other through the virtual communication channel based on the policy.

The agent as used herein includes not only a so-called agent system that has artificial intelligence and autonomously acts for human's work, but also a program module that determines a processing operation by itself according to an input signal, environment conditions, and the like in accordance with its own program even regarding a partial easy function and operates.

According to the above-mentioned structure, the agents on the virtual communication channel are operated in accordance with the relationship between the attributes of an agent and a role prescribed by a policy, whereby dynamic collaboration can be realized among agents.

If the policy includes, in addition to the rule representing a relationship between attributes of the agent and a role assigned in accordance with the attributes, at least one of a rule representing a relationship between attributes of a data object and an agent's reaction to manipulation with respect to the data object, a rule representing a relationship between a collection of the roles and a collection of the reactions, and a rule representing a relationship between the collections of the roles, the behavior of resources and data on the virtual communication channel can be flexibly controlled.

Regarding the distribution of a policy, it may be possible that a policy generated by an agent is distributed to another agent, the agent having received the distributed policy obtains at least one role in accordance with attributes of the agent using the role assignment part based on the policy, thereby installing the processing execution part, and a virtual communication channel is formed among agents having the distributed policy in common. Further, it may be possible that a policy repository storing the policy is provided on the virtual communication channel, and each agent obtains a required policy from the policy repository and stores it in the policy storing part.

If a certification authority is provided on the virtual communication channel, and the certification authority authenticates access right of each agent to the virtual communication channel, and contents of a role held by the role holding part of each agent, the security of the virtual communication channel will be enhanced. For example, it may be possible that the certification authority is divided into a policy approving authority (PAA), an attribute authority (AA), and a certification authority (CA), the policy approving authority issues a policy certification for certifying that a policy is an authentic one, based on an electronic signature provided to data describing the policy, the attribute authority issues an attribute certification for certifying attributes of each agent, the certification authority issues a public key certification for certifying that an agent on the network has been authenticated, and each agent includes a trust engine for interpreting the policy certification and the attribute certification, and the role assignment part specifies appropriate contents of a role to be assigned to the agents, based on the policy and the attribute of the agents distributed on the network.

Because of the use of the above-mentioned authentication system, in logging in to a virtual communication channel, each agent uses the trust engine, and logs in to the virtual communication channel while obtaining certification of a policy by receiving an input policy certification and attribute certification corresponding to the virtual communication channel, and a policy can be safely propagated among agents participating on the virtual communication channel by a log-in chain of each agent.

It may possible that the policy storing part integrates policies selected from policies independently generated and managed, and generates a virtual private community among agents exchanging information based on the integrated policy on the virtual communication channel. It may also possible that the policy storing part divides the policy into independent policies, and generates virtual private communities independently among agents exchanging information based on the respective policies on the virtual communication channel for each policy after division.

Next, in an embodiment of the agent collaboration on the virtual communication channel, an agent making a request with respect to another agent transmits request information having LABEL information based on the policy, the agent that receives the request information and responds to the request information transmits response information having LABEL information based on the policy, and the agent that makes a request receives response information having the LABEL information based on the policy. Thus, collaboration of a request and a response can be conducted among agents by using LABEL information.

A production use method for utilizing or using a production can be provided by appropriately defining a policy, using an agent collaboration system that uses a virtual communication channel of the present invention as a service platform. A collaboration system of each agent using a virtual communication channel of the present invention, that is, an agent collaboration system is used as a service platform. The agent collaboration system connects agents to each other through a virtual communication channel, controls the virtual communication channel based on a policy that is a collection of rules containing a rule representing a relationship between attributes of the agent and a role assigned in accordance with the attributes, and defines an operation of the agents on the virtual communication channel by assigning a role in accordance with the attributes of the agents based on the policy. The policy defines the virtual communication channel dealing with contents. The role assigned in accordance with the policy is a use role for using the contents. Ause of the contents by agents other than those having the use role on the virtual communication channel is disabled, and the contents are used on the virtual communication channel.

Because of the above method, a new business model can be provided in which a policy can be defined by a copyright holder, and a production is distributed and sold in such a manner that the right to the copyright holder is sufficiently considered.

Next, the virtual communication channel of the present invention for brokering agent collaboration among agents present on a network is controlled based on a policy that is a collection of rules containing a rule representing a relationship between attributes of an agent and at least one role assigned in accordance with the attributes, allows each agent to have at least one role in accordance with the attributes thereof based on the policy, and virtually connects the operating agents to each other based on the policy, and brokers collaboration of each agent through execution of the contents of the role.

Because of the generation of the above-mentioned virtual communication channel, dynamic collaboration can be obtained among agents so that the agents on the virtual communication channel are operated in accordance with the relationship between the attributes of an agent and a role prescribed by a policy.

If a computer-readable recording medium storing a processing program for realizing the agent collaboration system of the present invention is provided, by allowing the recording medium to be read by a computer, the agent collaboration system of the present invention can be generated by using a computer apparatus, and an agent collaboration system capable of flexibly and easily generating and altering the virtual communication channel among agents can be generated.

These and other advantages of the present invention will become apparent to those skilled in the art upon reading and understanding the following detailed description with reference to the accompanying figures.

BRIEF DESCRIPTION OF THE DRAWINGS

FIG. 1 is a diagram showing an example of a part of a policy grammer used in the present invention.

DESCRIPTION OF THE PREFERRED EMBODIMENTS

Figure 2:
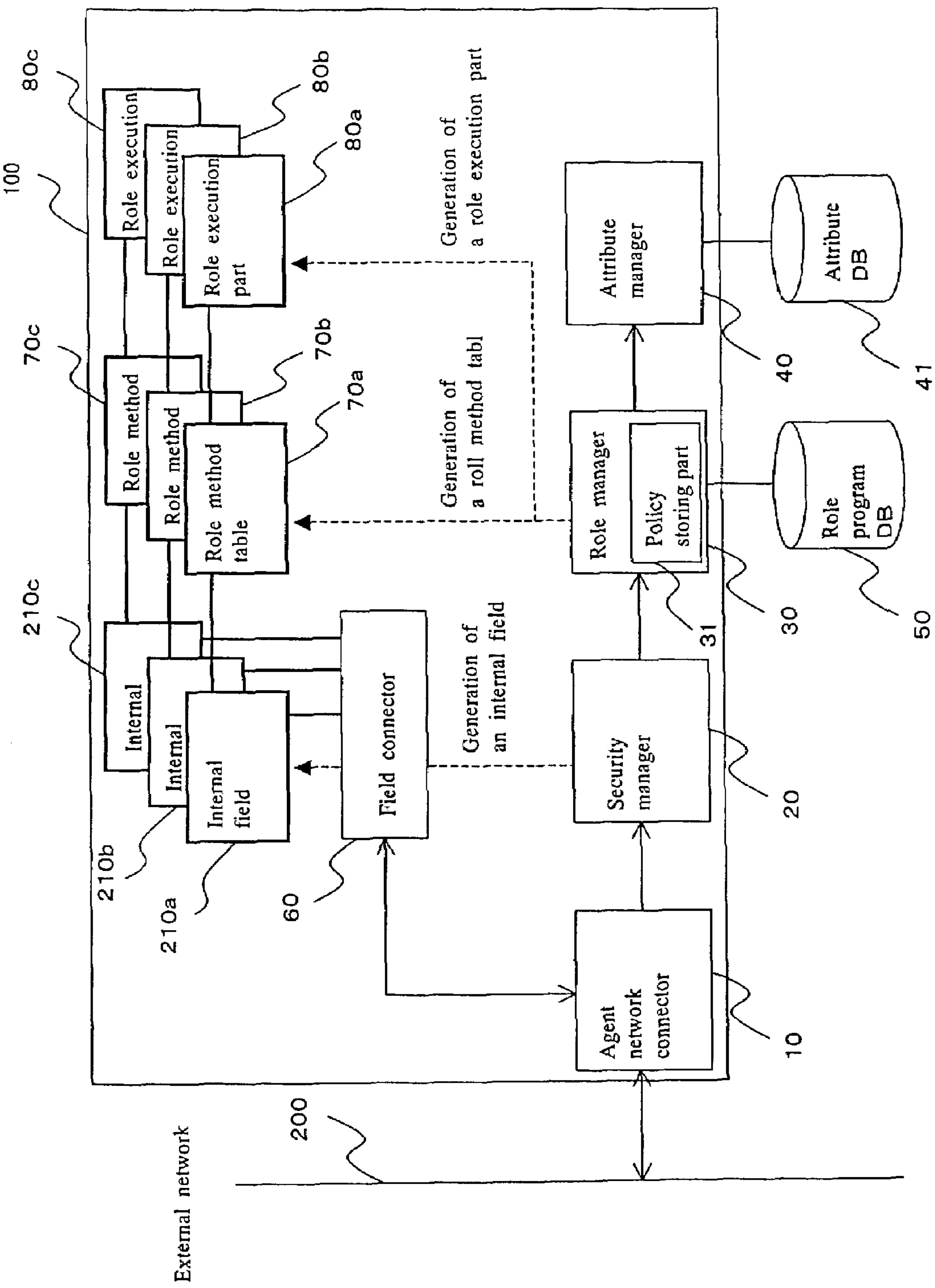
FIG. 2 schematically shows an exemplary structure of an agent collaboration system of Embodiment 1 according to the present invention.

Hereinafter, the present invention will be described by way of illustrative embodiments of an agent collaboration system with reference to the drawings.

Embodiment 1

An agent collaboration system of Embodiment 1 controls a virtual communication channel among agents on a network. Each agent on the virtual communication channel has at least one role in accordance with attributes of each agent, based on a policy that is a collection of rules. A rule represents the relationship between the attributes of the agent and at least one role assigned in accordance with the attributes. In the case where execution conditions for the role contents such as receiving of a message are satisfied, each agent is allowed to collaborate by executing the corresponding role contents. The virtual communication channel of the present invention is controlled based on the policy, and virtually connects agents based on the policy, whereby collaboration among the agents can be achieved. Further, the virtual communication channel of the present invention provides a virtual private community among agents.

Hereinafter, as an embodiment of the agent collaboration system of the present invention, a policy, roles (ROLE) assigned in accordance with the attributes of an agent, and LABEL information of a data object in the present invention will be described. Then, an exemplary structure and operation of the agent collaboration system, and states of dynamic generation, alteration, and self-destruction of a virtual communication channel will be described.

First, the definitions and relationships of an agent, a policy, agent roles (ROLE), and LABEL information of a data object in the present invention will be described.

The agent as used herein includes not only a so-called agent system that has artificial intelligence and autonomously acts for human's work, but also a program module that determines a processing operation by itself according to an input signal, environment conditions, and the like in accordance with its own program even regarding a partial easy function and operates.

The policy refers to a collection of rules describing the operation, characteristics, and relationship of a resource such as an agent or a data object on a virtual communication channel, and may be interpreted as a rule describing the operation, characteristics, and relationship of a virtual communication channel generated by collaboration among agents. There are a variety of rules described as a policy. A ROLE refers to a collection of roles regarding the operation on the virtual communication channel assigned in accordance with the attributes. A LABEL refers to a collection of reactions corresponding to the operation and the like of an agent on the virtual communication channel assigned in accordance with the attributes. For example, there is a rule describing the relationship between the ROLE and the ROLE and the relationship between the ROLE and the LABEL. Further, there is a rule describing the relationship between a collection of roles (ROLE) of an agent and a collection of reactions (LABEL) of a data object. Further, there is a rule describing the relationship between a collection of roles of an agent and another collection of roles (ROLE) of an agent. Further, the virtual communication channel itself is composed of a network of participating agents, so that generation, alteration, and self-destruction of the virtual communication channel can be described as part of the operation of an agent. Thus, the policy also contains a rule regarding the operation of the virtual communication channel containing generation, alteration, and self-destruction of the virtual communication channel.

The agent collaboration system may utilize a server managing, in a centralized manner, a policy (i.e., policy repository server) on the network so that each agent can obtain a policy, as described in Embodiment 4 later. Further, the agent collaboration system may have processing in which each agent distributes its own created and certified policy on the network, and receives the policy (makes a contract), and agents that have obtained a ROLE based on the policy generate a virtual communication channel. The latter case may be referred to as an autonomously distributed agent collaboration system using a virtual communication channel. For example, it can be assumed that an agent desiring to distribute contents of an image database managed by the agent prescribes and distributes a policy including a rule describing the relationship between the attribute that an agent having made a contract of paying a certain fee and at least one role of downloading the contents of the image database.

FIG. 1 shows an example of a policy. FIG. 1 shows exemplary description of a policy. Herein, an exemplary policy regarding simple image delivery service is shown. Reference numeral 1 denotes files to be distributed. Herein, "image.jar" represents a ROLE program file that is a program module including program codes with respect to all the roles in a policy and executing the roles, and "image.xml" represents a policy description file. Reference numeral 2 denotes a rule group for assigning a ROLE. In the rule group, there are descriptions of conditions for assigning a ROLE (i.e., specification of attributes and values thereof) (3 in FIG. 1), and a ROLE to be assigned when the conditions are satisfied (4 in FIG. 1). In the exemplary policy in FIG. 1, attributes regarding the payment of a registration fee is first paid attention to. If a registration fee has been paid, an agent will be assigned a ROLE of a registered user. On the contrary, in the case where a registration fee has not been paid, an agent will be assigned a ROLE for an unregistered user, as defined in the third item of the rule. Further, regarding a contract of whether or not an agent will become a provider of image contents, in the case where an agent has made a contract, the agent will be assigned a ROLE as a provider of image contents. A policy having such description of a policy is prepared, and each agent is provided with the policy, whereby a virtual communication channel controlled based on the description of a policy can be generated. The virtual communication channel thus generated provides a virtual private community among agents.

The ROLE of an agent refers to a collection of roles assigned in accordance with the attributes of an agent, as described above. An agent operates in accordance with at least one assigned role, and executes collaboration together with another agent as part of the operation. In the ROLE, role contents that can be executed are determined, and execution conditions for executing the role contents are determined. Herein, there are various execution conditions, such as receiving of a particular message from a virtual communication channel, a shift of the status of an agent to a particular status, occurrence of a certain event, passage of a predetermined period of time from a certain event, etc.

The LABEL information of a data object is a collection of reactions corresponding to the operation and the like of an agent assigned in accordance with the attributes of a data object, as described above. Examples of the LABEL information include enabling of reading, writing, and deletion of data contents by an agent having at least one predetermined role; and enabling of calculation, searching, and transfer by an agent having at least one predetermined role.

Next, an exemplary structure of an agent collaboration system will be described.

FIG. 2 schematically shows an exemplary structure of the agent collaboration system, wherein the exemplary internal structure of one agent is illustrated. In the agent collaboration system of the present invention, agents, which have the structure shown in FIG. 2, collaborate with each other through the network. The virtual communication channel of the present invention is a collaboration space (i.e., virtual private community) that is virtually formed on the network connecting the agents to each other.

In FIG. 2, reference numeral 100 denotes an agent, 200 denotes an external network, and 210 denotes an internal field. Reference numeral 10 denotes an agent network connector, 20 denotes a security manager, 30 denotes a ROLE manager, 40 denotes an attribute manager, 50 denotes a ROLE program database, 60 denotes a field connector, 70 denotes a ROLE method table, and 80 denotes a ROLE execution part.

In the above-mentioned structure of the agent 100, the security manager 20, the ROLE manager 30, the attribute manager 40, and the ROLE program database 50 are modules for generating, altering, and eliminating the internal field 210 based on a policy. The agent 100 has the field connector 60. The security manager 20 generates the internal field 210 on the field connector 60. Further, the ROLE manager 30, and the attribute manager 40 form the ROLE method table 70 and the ROLE execution part 80 connected to the internal field 210. In the example shown in FIG. 2, three internal fields 210*a* to 210*c*, ROLE method tables 70*a* to 70*c*, and ROLE execution parts 80*a* to 80*c* are generated.

The internal field 210, the ROLE method table 70, and the ROLE execution part 80 are modules for executing actions in the case where role execution conditions are satisfied. For example, these modules allow the corresponding ROLE to react when a particular message is received from the external network 200, thereby executing it. The other agents are not shown in FIG. 2. The other agents can be configured in the same way as in the agent 100

Each module will be described. The network agent connector 10 provides a communication interface for connecting the agent 100 to the external network 200. The network agent connector 10 receives a message from the external network 200, and determines whether the message is sent to the security manager 20 or the field connector 60 in accordance with the type of the message. In the case where the received message is the message regarding generation, alteration, and self-destruction of a field, such as a field generation message, a field searching message, and a field destruction message, the received message is sent to the security manager 20. In the case where the received message is a field message regarding agent collaboration, the message is sent to the field connector 60.

The security manager 20 has a function of confirming the validity of a message when receiving a message regarding generation, alteration, and self-destruction of a field; a function of interpreting the message contents and executing generation, alteration, and self-destruction of the internal field 210 in accordance with the instruction of generation, alteration, and self-destruction of a filed; and a function of extracting a policy from the message. The function of confirming the validity of a message is required for enhancing the security of the agent collaboration system of the present invention. Regarding the function of executing generation, alteration, and destruction of the internal field 210, the field connector 60 becomes a point for connecting the generated internal field 210 to the external network 200, and the generation, alteration, or destruction of the internal field 210 is executed by the security manager 20. Due to the function of extracting a policy from a message, the policy as shown in FIG. 1 is extracted and given to the ROLE manager 30.

The ROLE manager 30 is installed as a role assignment part. The ROLE manager 30 interprets the policy received from the security manager 30, checks the attributes of an agent, and controls the generation and elimination of a ROLE. In order to refer to the attributes specified in the attribute condition part of each rule in the policy and the values thereof and the attributes of an agent and the values thereof, the ROLE manager 30 inquires of the attribute manager 40 about the attributes and the values thereof. When the ROLE manager 30 receives an answer from the attribute manager 40, and the conditions for the rule are satisfied, the ROLE manager 30 notifies the ROLE method table 70 of a ROLE name, and gives an instruction regarding generation of the ROLE method table 70 or the alteration of the contents thereof The ROLE manager 30 includes a policy storing part 31 for storing a policy.

The attribute manager 40 includes an attribute database 41. The attribute manager 40 refers to the attribute database 41 in response to the inquiry from the ROLE manager 30 about the attributes of an agent and the values thereof, and replies to the inquiry.

The ROLE program database 50 stores a program for installing the ROLE execution part 80. When the ROLE execution part 80 is installed, a required program is retrieved from the ROLE program database 50 and configured as a ROLE execution part. The ROLE program may be present out of the network, as long as it can be accessed and downloaded.

The internal field 210 is generated, altered, or self-destroyed in accordance with an instruction from the security manager 20. If there is an instruction of generation of the internal field 210, a new internal field is generated on the field connector 60. Similarly, if there is an instruction of destruction of the existing internal field 210, the field connector 60 destroys the internal field 210.

Regarding the execution processing of the actions in the case where the role execution conditions such as receiving of a message are satisfied, each field connector 60 of each agent receives a field message from the agent network connector 10 and inspects the contents and attributes of the field message. The field connector 60 sends the field message only to appropriate internal field(s) 210 (=one or some of 210*a* to 210*c*). Further, the field connector 60 receives a response message returned as part of the execution processing of the ROLE execution part 80, and sends the response message to the external network 200 through the agent network connector 10.

The ROLE method table 70 is installed as a role-execution condition storing part. The ROLE method table 70 receives an instruction from the ROLE manager 30, and generates a table or alters the contents thereof. In generation of an internal field, the ROLE method table 70 is notified of a ROLE name from the ROLE manager 30, retrieves an appropriate ROLE from a ROLE program collection, associates an appropriate method with the specified ROLE, and stores the ROLE. Further, the ROLE method table 70 associates the ROLE with execution conditions, and stores the ROLE in the table. Next, regarding the execution processing of the actions in the case where the role execution conditions such as receiving of a message are satisfied, the ROLE method table 70 is inquired by the field connector 60, which has detected the conditions such as receiving of a field message, generation of various events, and alteration of an agent status, about whether or not there is a ROLE having any of these conditions as execution conditions. In the case where there is the corresponding ROLE, the ROLE method table 70 specifies a method for controlling the ROLE, and notifies the internal field 210 of the method.

Next, the ROLE execution part 80 receives an instruction from the ROLE manager 30, retrieves an appropriate ROLE from the ROLE program database 50, and stores them. Then, regarding the execution processing of the actions in the case where the role execution conditions such as receiving of a message are satisfied, the ROLE execution part 80 responses to a field message, and when a particular method is activated by the internal field 210, executes the ROLE contents corresponding to the method. In contrast, when the execution conditions are not satisfied, execution of the ROLE corresponding to the method control is terminated under the control of the method.

Figure 3:
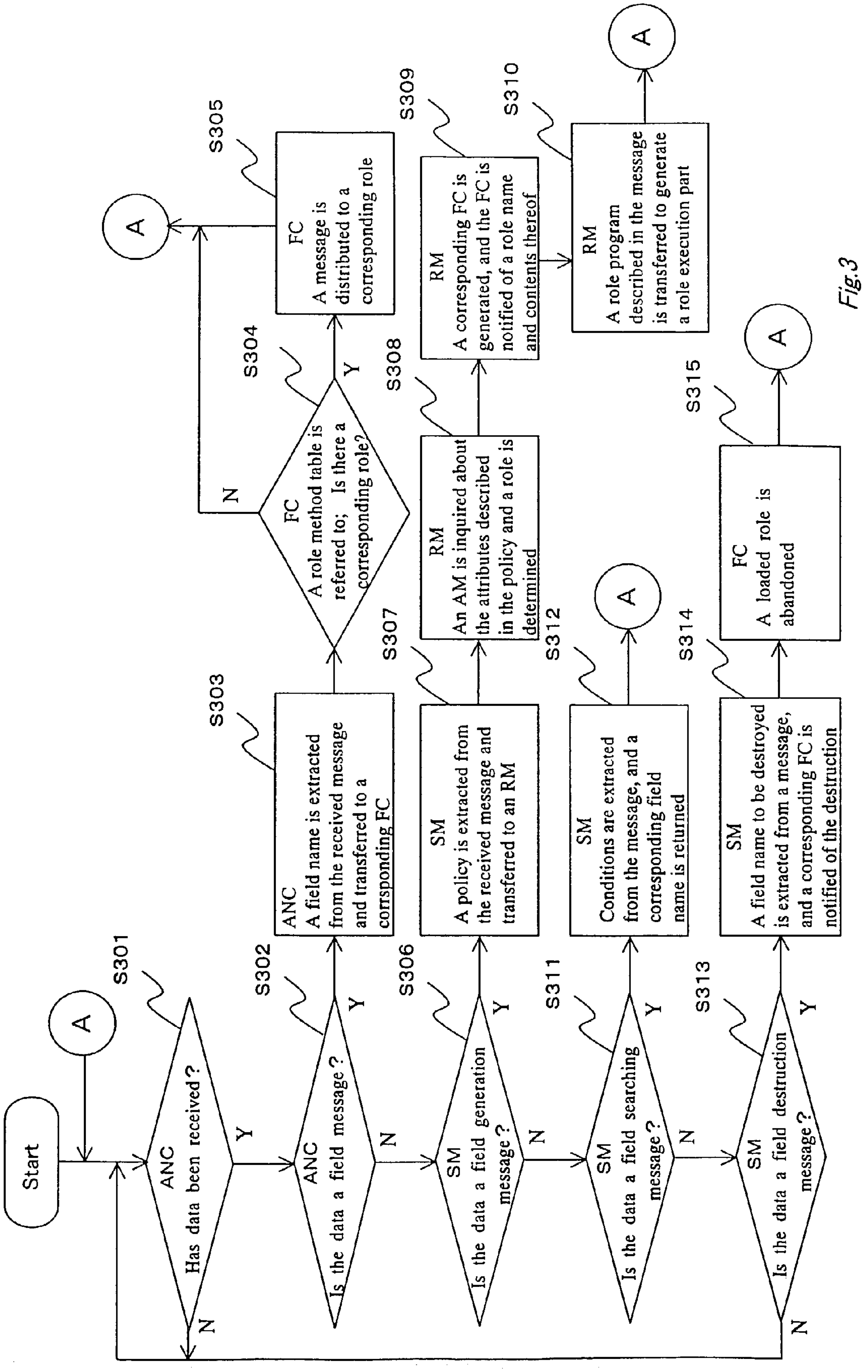
FIG. 3 is a flow chart illustrating exemplary generation of a virtual communication channel and a virtual private community for agents in the agent collaboration system of Embodiment 1 according to the present invention.

The operation of the agent collaboration system in the above-mentioned exemplary structure will be described with reference to a flow chart in FIG. 3. In the following example, the case will be described in which receiving of a particular field message is prescribed as ROLE execution conditions. For convenience of description of the flow chart in FIG. 3, the agent network connector, the field connector, the security manager, the ROLE manager, and the attribute manager are abbreviated as ANC, FC, SM, RM, and AM, respectively.

First, the agent network connector 10 monitors the external network 200 to receive data (Operation 301).

When the agent network connector 10 receives data from the external network 200 (Operation 301: Y), the agent network connector 10 checks if the data is a field message (Operation 302).

In the case where the data is a field message (Operation 302: Y), the agent network connector 10 extracts a field name from the field message, and transfers it to the corresponding field connector 60 (Operation 303).

The field connector 60 refers to the ROLE method table 70, and searches for a ROLE whose execution conditions is to receive a message (Operation 304). In the case where there is the corresponding ROLE (Operation 304: Y), a method for processing the ROLE is activated, and the ROLE is executed (Operation 305). Then, the process returns to Operation 301. In the case where there is no corresponding ROLE (operation 304: N), the ROLE does not react and is not executed. Then, the process returns to Operation 301.

Next, in Operation 302, in the case where received data is not a field message (Operation 302: N), the agent network connector 10 transfers the data to the security manager 20, and the security manager 20 checks if the received data is a new field generation message (Operation 306).

In the case where the received data is a new field generation message (Operation 306: Y), the security manager 20 extracts a policy from the received message, and transfers it to the ROLE manager 30 (Operation 307). The role manger 30 inquires the attribute manager 40 about the attributes described in a policy and the values thereof, and determines a ROLE assigned to an agent based on the response results from the attribute manager 40 (Operation 308).

The ROLE manager 30 generates the field connector 60 in response to the field generation message, and notifies the field connector 60 of a ROLE name to be provided and the contents thereof (Operation 309). In order to install the notified ROLE contents, the ROLE manager 30 loads the corresponding ROLE from the ROLE program collection to the ROLE execution part 80, and installs a required ROLE execution module and the internal field 210 (Operation 310). When the internal field 210 is generated, the process appropriately returns to Operation 301.

Next, in Operation 306, in the case where the received data is not a new field generation message (Operation 306: N), the security manager 20 checks if the received data is a field searching message (Operation 311). In the case where the received data is a field searching message (Operation 311: Y), the security manager 20 extracts field searching conditions from the message contents, and returns the field name corresponding to the searching conditions to the sender of the search message through the agent network connector 10 (Operation 312). Thereafter, the process appropriately returns to Operation 301.

In the case where the received data is not a filed searching message (Operation 311: N), the security manager 20 checks if the received message is a field destruction message (Operation 313). In the case where the received message is a field destruction message (Operation 313: Y), the security manager 20 extracts the name of a field to be destroyed from the field destruction message, and notifies the field connector 60 of the destruction of the field (Operation 314). The field connector 60 destroys the specified internal field 210 managed by the field connector 60 (Operation 315). Along with the destruction of the internal field 210, the corresponding ROLE method table 70 and the ROLE execution part 80 are eliminated. After the destruction of the field, the process appropriately returns to Operation 301.

In the case where the received message is not a field destruction message (Operation 313: N), an effective response to the received data is not conducted in this example, and the process returns to Operation 301, and next receiving of data is awaited.

The generation, alteration, and destruction of a virtual communication channel by the agent collaboration system of Embodiment 1 and an exemplary flow of the agent collaboration operation using the generated virtual communication channel have been described above.

Thus, the agent collaboration system and virtual communication channel connecting agents to each other of Embodiment 1 are controlled based on a policy that is a collection of rules, each representing the relationship between the attributes of an agent and the role assigned in accordance with the attributes, and can virtually connect the agents based on the policy, provide a virtual private community among agents, and broker the collaboration among the agents.

Embodiment 2

In Embodiment 2, the case will be described in which a virtual communication channel can be defined and controlled so as to provide a variation of a virtual private community among agents.

The exemplary structure of the agent collaboration system is the same as that shown in FIG. 2. Therefore, the description thereof will be omitted here.

Figure 4A:
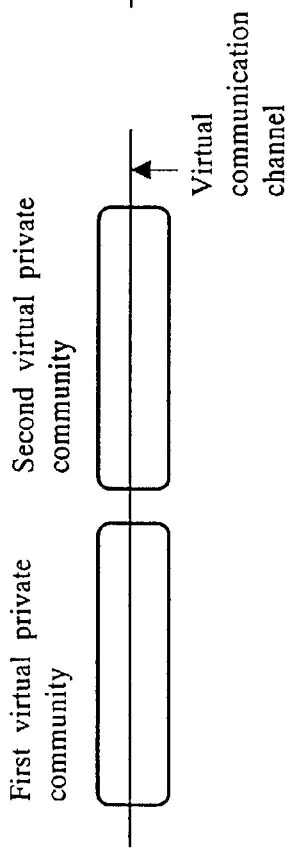
FIG. 4A shows a conceptual state of generation of virtual private communities among agents.

First, in the agent collaboration system of Embodiment 2, virtual private communities for agents can be provided in an independent manner. In this case, the security manager 20 and the ROLE manager 30 generate and manage independent internal fields 210 based on a policy, and allows agents to collaborate with each other by execution of a ROLE, whereby independent virtual private communities for agents are provided on a virtual communication channel. FIG. 4A shows a conceptual state of generation of independent virtual private communities for agents.

Figure 4B:
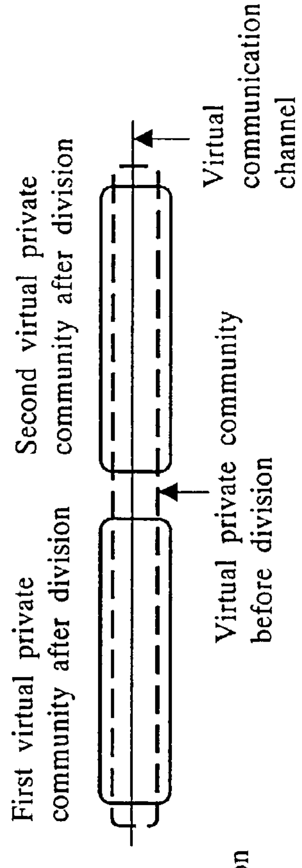
FIG. 4B shows a conceptual state of integration of virtual private communities among agents.

Second, in the agent collaboration system of Embodiment 2, it is possible to integrate virtual private communities for agents generated in an independent manner. In this case, by giving an instruction of integrating fields selected from internal fields 210 generated and managed in an independent manner by the security manger 20 and the ROLE manager 30, the corresponding field connector can be regenerated as one field connector, and one internal field is regenerated. Thus, a virtual private community for agents is generated in such a manner that the existing two independent virtual private communities for agents are integrated. FIG. 4B shows a conceptual state of integration of independent virtual private communities for agents.

Figure 4C:
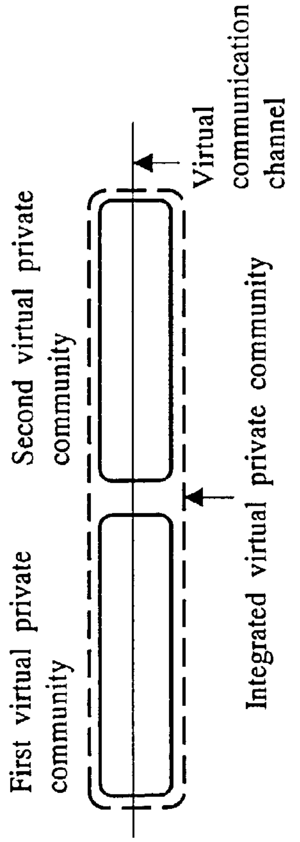
FIG. 4C shows a conceptual state of division of a virtual private community among agents.

Third, in the agent collaboration agent of Embodiment 2, it is possible to divide the existing virtual private community for agents. In this case, the security manager 20 and the ROLE manager 30 give an instruction of generation of one field and the other field after division, whereby the respective corresponding field connectors are generated, and the respective internal fields are also generated. FIG. 4C shows a conceptual state of division of the virtual private community for agents.

Figure 4D:
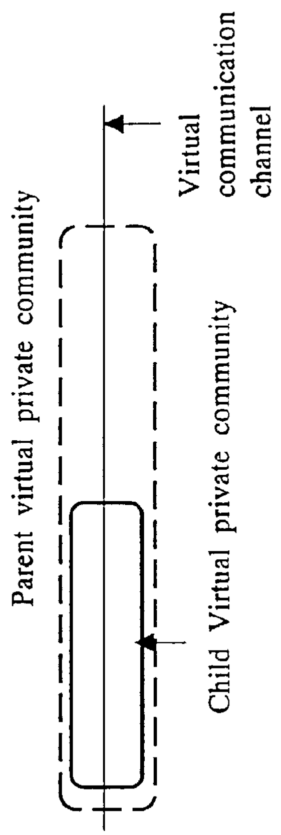
FIG. 4D shows a conceptual nested state of virtual private communities among agents.

Fourth, in the agent collaboration system of Embodiment 3, it is also possible to set the virtual private community for agents as a parent, and generate a virtual private community for agents corresponding to a child in a so-called nested state. In this case, the security manager 20 and the ROLE manager 30 give an instruction of generation of a parent field and a child field, whereby the parent field and the child field are generated. FIG. 4D shows a conceptual nested state of the virtual private community for agents.

As described above, according to the agent collaboration system of Embodiment 2, a virtual private community for agents to be generated based on a policy can be provided with a variation.

Embodiment 3

In Embodiment 3, an exemplary structure of the agent collaboration system will be described in which security is enhanced regarding policy certification for ensuring the authenticity of a policy, ROLE accreditation for ensuring the authenticity of a ROLE, safe distribution of a policy by log-in chain in the case of a complete autonomous distributed structure, processing against unauthorized access, confirmation of agent collaboration, and the like.

First, policy certification for ensuring the authenticity of a policy, and ROLE accreditation for ensuring the authenticity of a ROLE will be described. Then, processing will be described in which each agent receives a certified authentic policy, is assigned a correctly accredited ROLE, and participates on a virtual communication channel.

Figure 5:
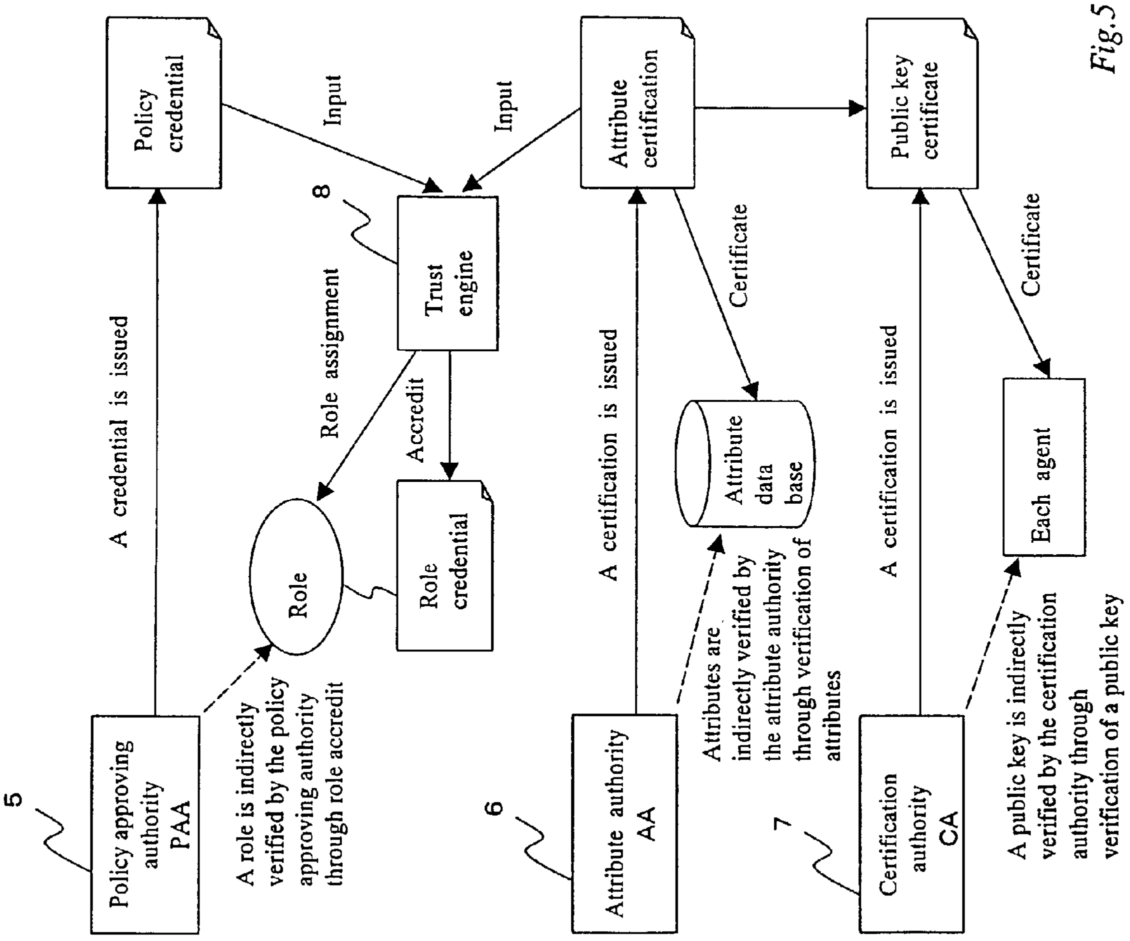
FIG. 5 schematically shows a concept of policy certification and ROLE accreditation in Embodiment 3 according to the present invention.

FIG. 5 schematically shows a concept in which policy certification for ensuring the authenticity of a policy, and ROLE accreditation for ensuring the authenticity of a ROLE are conducted. In FIG. 5, reference numeral 5 denotes a PAA that is an authority entity for issuing a policy certification, 6 denotes an AA that is an authority entity for issuing an attribute certification, and 7 denotes a CA that is an authority entity for authenticating an individual and for issuing a public key certification. Stricter security is provided to generation of a virtual communication channel in a large distributed environment and exchange of information using the virtual communication channel by providing three authority entities so that different authority functions are dispersed regarding three aspects: policy authentication, attribute authentication, and individual authentication, whereby.

The policy certification refers to data describing a policy provided with an electronic signature. That is, the policy certification is used for certifying that a policy is an authentic one, rightfully distributed on the network. The policy certification is distributed to an agent and the like through the network. Due to a certain policy certification, a virtual network region where the identical policy is propagated becomes a trust domain (i.e., a virtual private community formed by a virtual communication channel). When a new agent tries to join a certain trust domain to participate on a virtual communication channel, it is required that the agent first receives a corresponding policy certification, agrees to the contents thereof, and is assigned at least one role based on the policy certification.

The attribute certification is used for the attribute authority 6 authenticating individual attributes to certify the attributes of each agent. For example, the attribute certification is described in accordance with ITU-TX.509 attribute certification. In issuing an attribute certification by the attribute authority 6, the attribute authority 6 can refer to the attributes of each agent by accessing the attribute database 41 of each agent shown in FIG. 2.

The public key certification is used for authenticating an individual on the network. The public key certification is issued by the certification authority 7 that is an authority entity for authenticating an individual, for example, on the basis of a public key authentication base such as ITU-TX.509 public key certification.

Next, processing will be described in which each agent receives a certified authentic policy and is assigned a rightfully accredited ROLE.

In FIG. 5, reference numeral 8 denotes a trust engine provided to each agent. The trust engine 8 interprets an input policy certification and attribute certification propagated on the network, and specifies and assigns an appropriate ROLE corresponding to the policy certification and the attribute certification. The trust engine provided to each agent is composed of the ROLE manager 30 and the attribute manager 40 as a complex function in each agent structure described in Embodiment 1 with reference to FIG. 2.

In the authentication system in Embodiment 3, each agent is provided with the trust engine 8, and the trust engine 8 safely interprets a policy certification and an attribute certification issued based on the reliability of the policy approving authority 5, the attribute authority 6, and the certification authority 7, and assigns a ROLE. The assigned ROLE is provided with a ROLE credential, whereby the validity of the ROLE is accredited. The validity of the trust engine itself can be verified, for example, by cross-authentication by the SSL and verification of an object signature, on the basis of the public key authentication base. Thus, the validity of the ROLE credential generated by the trust engine can also be guaranteed.

Based on the generated ROLE credential, a ROLE is assigned in each agent under the control of the ROLE manager.

A policy is certified and a ROLE is accredited based on the above-mentioned authentication system, and a virtual communication channel is generated and controlled with stricter security and each agent can safely enter the virtual communication channel.

Next, safe policy distribution by a log-in chain will be described in the case of a complete autonomous distribution structure. An agent participating on a virtual communication channel, through which the identical policy is propagated, can arbitrarily enter therein, and participants thereof will dynamically change. In the case where the agent collaboration system controlling a virtual communication channel of the present invention as a distribution type system, there is no particular agent for centralized authenticity management whose authenticity is guaranteed. Therefore, an agent trying to newly participate on a virtual communication channel requests log-in with respect to an arbitrary agent that has already participated on the virtual communication channel. The log-in to the virtual communication channel by each agent is conducted based on attribute information and a policy of each agent as shown in FIG. 5, and an agent is assigned a ROLE as the result of the log-in. Herein, as the trust engine 8 conducting ROLE assignment at log-in, the one operated on an agent that has already participated in a trust domain is not used, but the one operated on an agent trying to newly participate therein is used. Because of this, safe log-in processing can be conducted without notifying the others of attribute information that is kind of privacy information and without decreasing the security of the entire virtual communication channel. A log-in chain of each agent allows a policy to be safely propagated via log-in without using a centralized management system, and each agent can log in or log out at any time with respect to the virtual communication channel.

Figure 6:
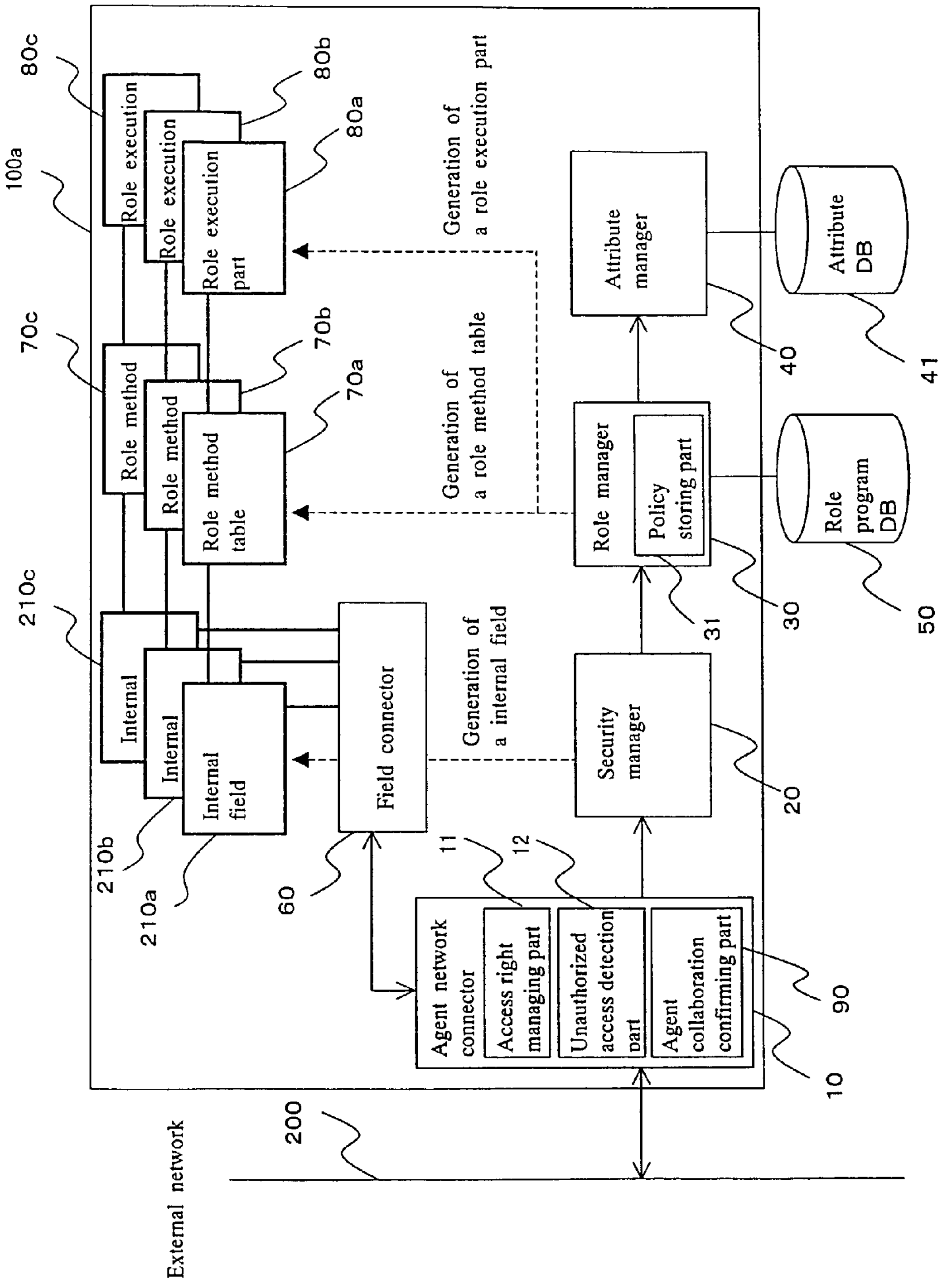
FIG. 6 schematically shows an exemplary structure of an agent collaboration system of Embodiment 3 according to the present invention.

Next, processing of eliminating a virtual communication channel in accordance with unauthorized access or a request from a participant will be described. In this processing, it is checked whether or not a message is exchanged among agents in a predetermined manner, and collaboration is normally conducted, and it is further checked whether or not there is unauthorized access; in the case where there is unauthorized access, a virtual communication channel is dynamically self-destroyed. FIG. 6 shows an exemplary structure of an agent collaboration system in which an exchange of a message among agents is confirmed, and unauthorized access is detected. The description of the same components as those described in Embodiment 1 with reference to FIG. 2 will be omitted here.

As shown in FIG. 6, an agent **100*a* has an agent collaboration confirming part 90. Further, as one of processing functions, upon receiving a message, each agent returns acknowledgement to a virtual communication channel. The agent collaboration confirming part 90 monitors a message sent through the virtual communication channel via an agent network connector 10, and confirms a request message sent from an agent. Thereafter, the agent collaboration confirming part 90 continues to monitor a message, and monitors an acknowledgement message of another agent that has received the request message, thereby confirming that the request message has been received. In this manner, a message sent through the virtual communication channel and acknowledgement with respect to the message are monitored by using the agent collaboration confirming part 90**, whereby it is confirmed that brokering of information among agents is normally conducted, and collaboration among agents is normally conducted.

The agent network connector 10 includes an access right managing part 11 and an unauthorized access detecting part 12.

The unauthorized access detecting part 12 detects unauthorized access to a virtual communication channel. There are various methods for detecting fraud. For example, if an agent accesses the virtual communication channel in violation of the contents of access right managed by the access right managing part 11, and transmits/receives a message, the unauthorized access detecting part 12 detects that there has been unauthorized access. Further, for example, the unauthorized access detecting part 12 has a function of detecting tampering of a message. The unauthorized access detecting part 12 checks if an electronic signature is not broken in the case where an electronic signature is embedded in a message, checks if there is any abnormality in an electronic watermark in the case where an electronic watermark is embedded in a message, checks if a message that does not comply with a ROLE has been received, and checks if an agent accesses a data object by a method that does not comply with the qualification of the agent, thereby detecting unauthorized access.

When detecting unauthorized access, the unauthorized access detecting part 12 notifies the security manager 20 of an instruction of eliminating a field, and the security manager 20 destroys an internal field in which unauthorized access has been attempted, and brakes connection with the external network 200.

The destruction of the virtual communication channel can also be requested by an agent's initiative. For example, in the case where a ROLE and the like of a ROLE execution part 80 request destruction of a virtual communication channel, the agent network connector 10 is notified of the request through the field connector 60, and the agent network connector 10 instructs the security manager 20 to destroy the corresponding virtual communication channel. The security manager 20 destroys the corresponding internal field.

Further, it is also possible that an expiration date is set with respect to the virtual communication channel so as to destroy it. For example, the security manager 20 or the field connector 60 has a timer, and detects whether or not an expiration date has come, using the timer; if it is detected that the expiration date has come, the corresponding internal field 210 is self-destroyed based on an instruction from the security manager 20, or the field connector 60 having detected that the expiration date had come destroys the corresponding internal field 210 automatically.

Further, the agent collaboration system of Embodiment 3 can also enhance security by encoding a message exchanged among agents. Agents have both an encoding function for a transmitted message and a decoding function for a received message, thereby executing encoding/decoding of a message for each transmission/receiving of a message. It can be determined, for example, based on a ROLE to be used, which encoding key and decoding key are used.

As described above, in the agent collaboration system of Embodiment 3, security can be enhanced regarding policy certification for ensuring the authenticity of a policy, ROLE accreditation for ensuring the authenticity of a ROLE, encoding/decoding of a message exchanged in collaboration among agents, management of access right to a virtual communication channel by each agent, processing with respect to unauthorized access, confirmation of agent collaboration, and the like.

Embodiment 4

In the agent collaboration system of Embodiment 4, regarding distribution of a policy, a policy repository server is provided.

Figure 7:
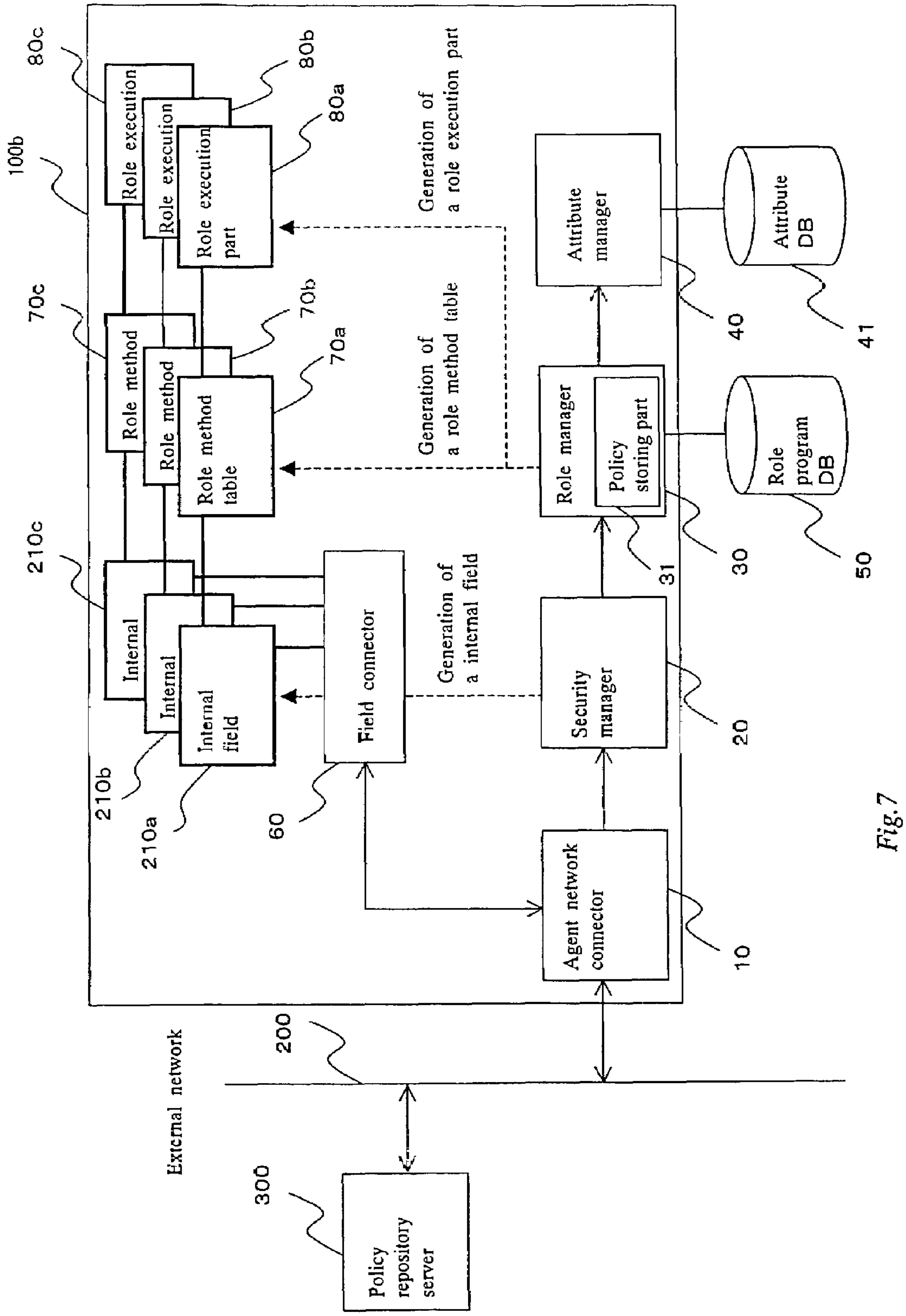
FIG. 7 schematically shows an exemplary structure of an agent collaboration system of Embodiment 4 according to the present invention.

FIG. 7 is an exemplary structure of an agent collaboration system provided with the policy repository server in Embodiment 4. Reference numeral 300 denotes a policy repository server, which stores policies.

When an agent 100*b* generates a virtual communication channel or participates on an existing virtual communication channel, the agent 100*b* has to obtain a policy describing a target virtual communication channel, and generate a ROLE based on the policy. The agent 100*b* accesses the policy repository server 300, and requests transmission of a target policy. The policy repository server 300 transmits the corresponding policy from the stored policies to the requesting agent 100*b*. The agent 100*b* having received the policy passes the policy to a security manager 20 via an agent network 10. The security manager 20 extracts the policy and passes it to a ROLE manger 30. The ROLE manager 30 stores the policy in a policy storing part 31. In this case, the security manger 20 and the ROLE manager 30 generate the corresponding internal field based on the received policy, which is the same as that in Embodiment 1.

As described above, the agent collaboration system of Embodiment 4 is provided with a policy repository server that can uniformly manage and distribute a policy, thereby distributing a policy to an agent that does not have any policy, and distributing an updated policy to an agent in the case where the policy is updated.

Embodiment 5

Next, as Embodiment 5, an exemplary application will be described in which a production use system is configured using an agent collaboration system that uses a virtual communication channel of the present invention as a service platform.

Figure 8:
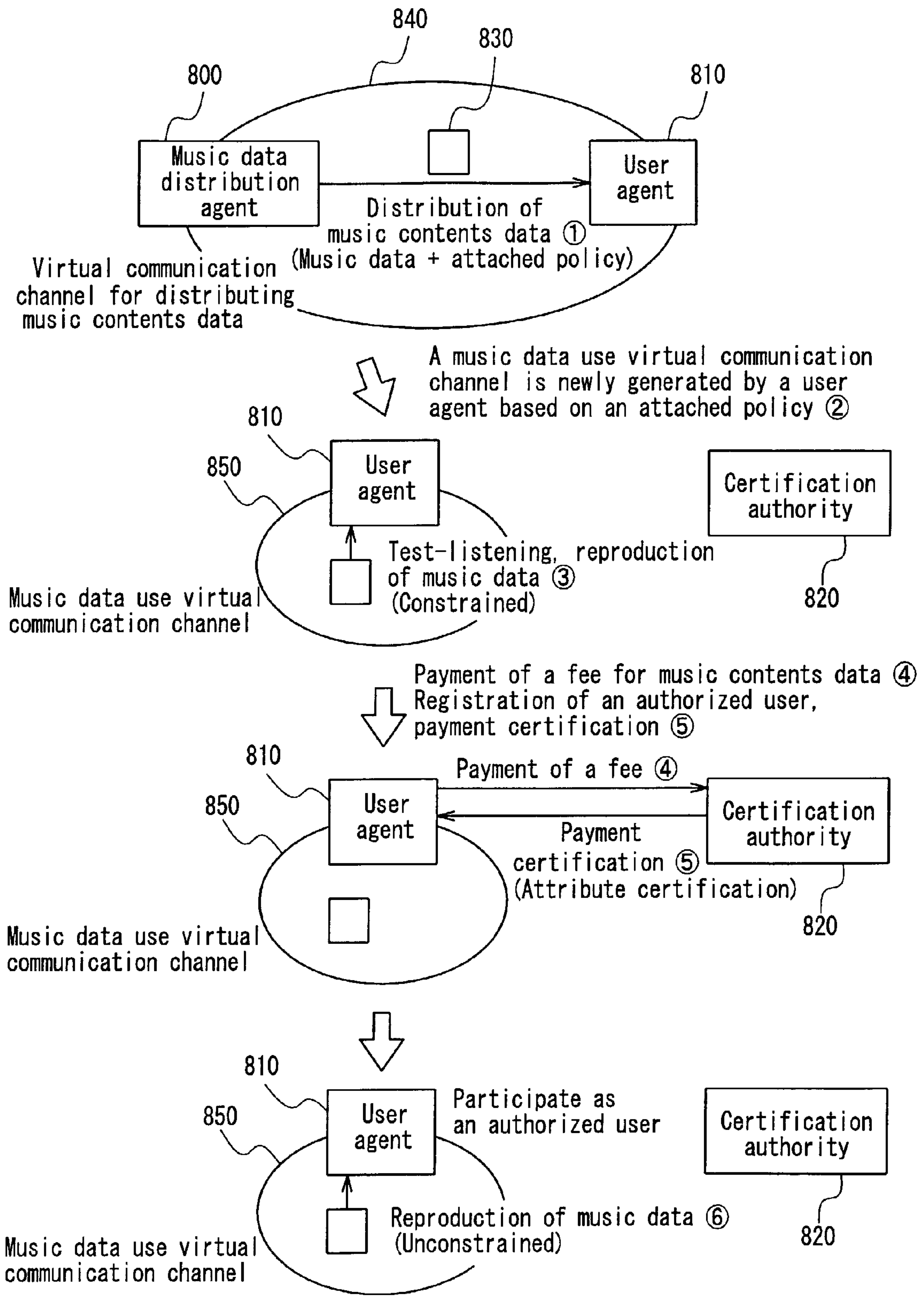
FIG. 8 shows an exemplary configuration of an application in which an agent collaboration system using a virtual communication channel of the present invention is used as a service platform.
Figure 9:
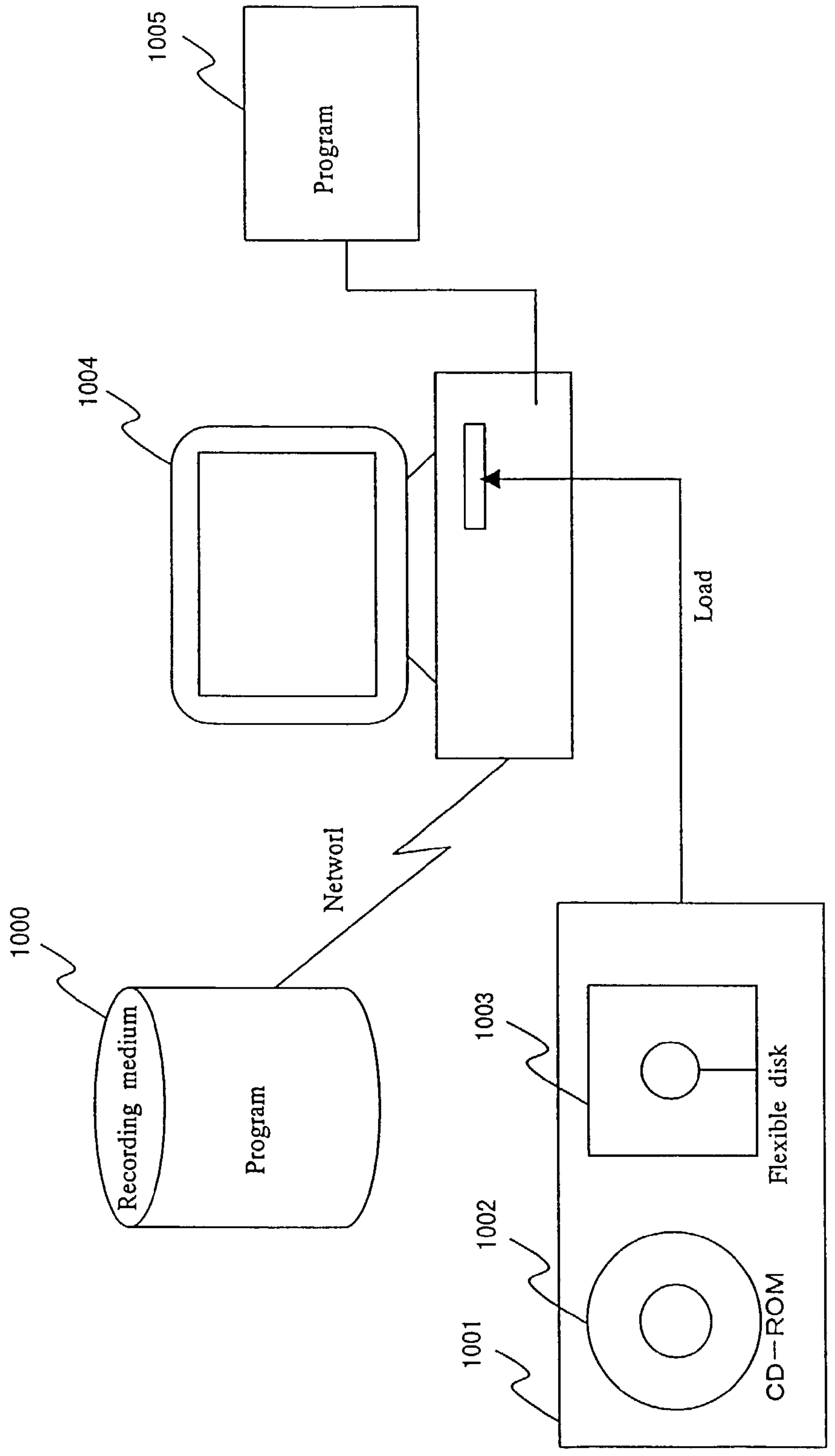
FIG. 9 shows examples of recording media storing a processing program for realizing an object agent collaboration system of Embodiment 6 according to the present invention.

FIG. 8 is a view showing an exemplary configuration of an application in which an agent collaboration system using a virtual communication channel of the present invention is used as a service platform, and distribution of music contents data and reproduction of music only by authorized users are made possible.

In FIG. 8, reference numeral 800 denotes a music contents data distribution agent, 810 denotes a user agent, 820 denotes a certification authority, and 830 denotes music contents data. The music contents data 830 contains music data and an attached policy as described later. Reference numeral 840 denotes a virtual communication channel for distributing music data generated based on a music contents data distribution policy, and 850 denotes a virtual communication channel for using music data that is a second virtual communication channel generated based on the attached policy. The virtual communication channel for distributing music data 840 and the virtual communication channel for using music data 850 shown in FIG. 8 conceptually represent a field of a virtual communication channel, and generated and controlled in accordance with a policy as described in Embodiment 1.

The virtual communication channel for distributing music data 840 is generated based on the music contents data distribution policy, and on the virtual communication channel for distributing music data 840, the music contents data distribution agent 800 and the user agent 810 are present. In the figure, only one user agent 810 is shown; however, a plurality of user agents may be present. Furthermore, a user agent that desires to newly participate in the virtual communication channel for distributing music data 840 may be admitted at any time. Herein, it is also possible to admit a qualification for participation in the virtual communication channel for distributing music data 840. For example, as the qualification for participation, particular attributes of a user agent and/or payment of a participation fee may be used.

In this example, it is assumed that the user agent 810 has a qualification for participation in the virtual communication channel for distributing music data 840, and has attributes for permission of receiving distribution of music data from the music contents data distribution agent 800. The attributes of the user agent 810 are verified by an attribute certification issued by the certification authority 820.

The user agent 810 downloads the music contents data 830 from the music contents distribution agent 800 (① in FIG. 8).

The music contents data 830 contains music data and an attached policy.

The music data refers to the data of a body of music contents such as MP3 encoded data. If a music data portion can be obtained easily from music contents data, the music data portion is used without authorization. Therefore, it is preferable to encrypt or shuffle music data, thereby preventing music data from being discriminated from music contents data. Furthermore, it is preferable to prevent music data from being easily reproduced even if it can be discriminated. A METHOD for using music data can be used only by an authorized user. Therefore, an unauthorized use of music data can be prevented.

In this example, the attached policy is used for generating the virtual communication channel for using music data 850 for dealing with music data. In accordance with the attached policy, the virtual communication channel for using music data 850 for dealing with music data is generated as a second virtual communication channel (② in FIG. 8). The second virtual communication channel refers to a local virtual communication channel that is individually generated by using an attached policy contained in the data. In this example, the attached policy contains a policy related to service for use and reproduction of music data. Therefore, the virtual communication channel for using music data 850 generated as the second virtual communication channel can control service for use and reproduction of music data.

The music data can be used only by a METHOD provided to a ROLE present on the virtual communication channel for using music data 850. For example, a ROLE includes a trial user, an authorized user, a distributor, and the like. The trial user has a competence of test-listening to a part of music data for free, a competence of reproducing music data a predetermined number of times for free, and the like (③ in FIG. 8). In the case where the user test-listens to music and likes it, the user pays a fee for the music data to the certification authority 820 (④ in FIG. 8). The user registers himself/herself as an authorized user, and is given an attribute certification for an authorized user from the certification authority 820 (⑤ in FIG. 8). If the trial user obtains an attribute certification for an authorized user, he/she is released from the constraint (i.e., the constraint regarding the use such as partial reproduction of music data or only a predetermined number of times of reproduction).

As described in Embodiment 3, the certification authority 820 is a policy approving authority as an entity of issuing a policy certification, an attribute approving authority as an entity of issuing an attribute certification, and an individual certification authority that authenticates an individual and is to be an entity of issuing a public key certification. In the case where there are a plurality of authentication entities 800, these authentication entities establish a relationship among them, thereby authenticating each other and configuring the entire relationship.

As described above, after obtaining an attribute certification for an authorized user by paying a fee, the user agent 810 can use music data, utilizing a METHOD available on the virtual communication channel for using music data 850.

Herein, the user agent 810 can duplicate music contents data as electronic data. If the user agent 810 that is an authorized user duplicates music contents data for use in another player of the user agent 810, since the user agent 810 has attributes appropriate as an authorized user, the user agent 810 can access the duplicated data with another player as an authorized user. On the other hand, in the case where duplicated data is redistributed to others without authorization, a person who receives the redistribution without authorization does not have attributes appropriate as an authorized user. Therefore, that person cannot use a METHOD for using the duplicated data, and cannot access music contests data. Thus, by allowing a METHOD for an authorized use to be utilized only with attributes verifying authorized purchase, an unauthorized use of music contents can be prevented.

According to an application in which an agent collaboration system using a virtual communication channel of the present invention is used as a service platform, a policy can be defined by a copyright holder, and an application such as sales service of contents and reproduction service can be configured in such a manner that the right to the copyright holder is sufficiently considered.

Embodiment 6

The object agent collaboration system of the present invention can be generated, using various computers, by storing a program describing processing steps of realizing the above-mentioned structure in a computer readable recording medium. Examples of the recording medium storing a program describing processing steps of realizing the object agent collaboration system of the present invention include a recording medium 1000 in a recording apparatus on the network, and a recording medium 1005 such as a hard disk and a RAM of a computer, as well as a portable recording medium 1001 such as a CD-ROM 1002 and a flexible disk 1003. In execution, the program is loaded onto a computer 1004, and executed on a main memory.

In addition to a compiled source program, it may also be possible that a so-called Aplet in an intermediate language format is transmitted to a client computer through a network, and an interpreter execution is processed on the client computer.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for controlling virtual communication channels for using a production data, comprising:

storing on a computer readable recording medium a policy that is a collection of rules containing a rule representing a relationship between an attribute of an agent and a role assigned in accordance with the attribute, and assigning a role in accordance with attributes of each agent based on the policy, the policy being used to define a virtual communication channel;

allowing agents to communicate with other agents through the virtual communication channel defined based on the policy;

authenticating access rights of each agent to the virtual communication channel and contents of a role;

issuing a policy certification for certifying that a policy is authentic based on an electronic signature provided to data describing the policy;

issuing an attribute certification for certifying the attributes of each agent;

issuing a public key certification for certifying that an agent on a network has been authenticated, each agent including a trust engine for interpreting the policy certification and the attribute certification;

generating a production distribution virtual communication channel based on a policy of distributing production data from a production distribution agent to a user agent qualified to receive distribution of the production data on an agent collaboration system;

obtaining the production data and an auxiliary policy that defines a production use virtual communication channel handling the production data, using the user agent, from the production distribution agent on the agent collaboration system through the production distribution virtual communication channel; and dynamically generating the production use virtual communication channel responsive to receipt of the auxiliary policy using the user agent, thereby enabling use of the production data only via a communication entity implemented by said production use virtual communication channel.

2. The method according to claim 1, comprising:

eliminating the production use virtual communication channel based on the auxiliary policy subsequent to use of the production data.

3. An agent collaboration system for connecting agents to each other through a virtual communication channel, each agent on the virtual communication channel comprising:

a policy storing part storing on a computer readable recording medium; a policy that is a collection of rules containing a rule representing a relationship between an attribute of an agent and a role assigned in accordance with the attribute, the policy being used to define the virtual communication channel;

a role assignment part having a policy storing part for providing a role in accordance with attributes of each agent based on the policy;

a role-execution condition storing part for storing the role assigned by the role assignment part and conditions for executing contents of the role; and a processing execution part for executing corresponding contents of a role in a case where the execution conditions for the contents of the role are satisfied, and wherein a production distribution virtual communication channel is generated based on a policy of distributing production data from a production distribution agent to a user agent qualified to receive distribution of the production data on an agent collaboration system, the user agent obtains the production data and an auxiliary policy that defines a production use virtual communication channel handling the production data, from the production distribution agent on the agent collaboration system through the production distribution virtual communication channel, the user agent dynamically generates the production use virtual communication channel responsive to receipt of the auxiliary policy, thereby enabling a use of the production data only via a communication entity implemented by said production use virtual communication channel, and the agent communicates with other agents through the virtual communication channel defined based on the policy; and an authentication entity is provided on the virtual communication channel adapted to authenticate access rights of each agent to the virtual communication channel and contents of a role held by the role-execution condition storing part of each agent, said authentication entity being divided into:

a policy approving authority issuing a policy certification for certifying that a policy is authentic based on an electronic signature provide to data describing the policy;

an attribute authority issuing an attribute certification for certifying attributes of each agent; and a certification authority issuing a public key certification for certifying that an agent on the network has been authenticated, each agent including a trust engine for interpreting the policy certification and the attribute certification.

4. A virtual communication method controlling virtual communication channels, comprising:

creating a first virtual communication channel based on a policy for distributing production data and transmitting the production data of a production distribution agent to a user agent based on the policy, the policy defining a relationship between attributes of each agent and a role assigned in accordance with the attributes; and dynamically creating a second virtual communication channel for using the production data responsive to receipt of an auxiliary policy attached to the production data in said first virtual communication channel;

executing a policy certification determining authenticity of the auxiliary policy based on an electronic signature provided to data describing the auxiliary policy and issuing an attribute certification for certifying attributes of user agent;

issuing a public key certification for certifying that the user agent on a network has been authenticated, each agent including a trust engine for interpreting the policy certification and the attribute certification;

enabling use of the production data by the user agent and other agents only via a communication entity implemented by said second virtual communication channel based on said auxiliary policy wherein a computer readable recording medium of a computer device stores the agents.

5. An agent collaboration method for connecting agents through a virtual communication channel, comprising:

a computer readable recording medium of a computer device storing the agents;

generating a first communication channel for agents having attributes indicating permission to receive production data, said first communication channel being defined based on a policy indicating a relationship between said attributes and roles assigned to the agents in accordance with the attributes;

dynamically integrating the first communication channel with a second communication channel responsive to receipt of an auxiliary policy via said first communication channel;

issuing a policy certification for certifying that the auxiliary policy is authentic based on an electronic signature provided to data describing the auxiliary policy and issuing an attribute certification for certifying the attributes of the agents;

issuing a public key certification for certifying that an agent has been authenticated, each agent including a trust engine for interpreting the policy certification and the attribute certification and exchanging the production data among agents executing corresponding roles assigned by the auxiliary policy via said second communication channel.

* * * * *

UNITED STATES PATENT AND TRADEMARK OFFICE

CERTIFICATE OF CORRECTION

PATENT NO. : 7,581,012 B2
APPLICATION NO. : 10/230164
DATED : August 25, 2009
INVENTOR(S) : Masatoshi Shiouchi et al.

It is certified that error appears in the above-identified patent and that said Letters Patent is hereby corrected as shown below:

Column 20, Line 61, change "certification" to --certification;--.

Signed and Sealed this

Twenty-fourth Day of November, 2009

David J. Kappos

David J. Kappos
*Director of the United States Patent and Trademark Office*